United States Patent
Vaidyanathan et al.

(10) Patent No.: US 8,155,220 B2
(45) Date of Patent: *Apr. 10, 2012

(54) IIR TRANSMIT FILTER FOR OFDM BASEBAND PROCESSOR

(75) Inventors: Karthik Vaidyanathan, Bangalore (IN); Partha Sarathy Murali, San Jose, CA (US); Prem Kiran Nerella, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 754 days.

This patent is subject to a terminal disclaimer.

(21) Appl. No.: 12/197,232

(22) Filed: Aug. 23, 2008

(65) Prior Publication Data

US 2010/0046647 A1 Feb. 25, 2010

(51) Int. Cl.
*H04L 27/28* (2006.01)
*H04B 1/10* (2006.01)
(52) U.S. Cl. .................. 375/260; 375/350
(58) Field of Classification Search .......... 375/247, 375/260, 350; 370/208, 210; 341/143; 708/307, 708/313
See application file for complete search history.

(56) References Cited

U.S. PATENT DOCUMENTS

| | | | | |
|---|---|---|---|---|
| 6,175,849 | B1 * | 1/2001 | Smith | 708/320 |
| 2002/0126768 | A1 * | 9/2002 | Isaksson et al. | 375/298 |
| 2003/0198299 | A1 * | 10/2003 | Redfern | 375/260 |
| 2006/0079184 | A1 * | 4/2006 | Do et al. | 455/63.1 |

* cited by examiner

*Primary Examiner* — Young T. Tse
(74) *Attorney, Agent, or Firm* — File-EE-Patents.com; Jay A. Chesavage

(57) ABSTRACT

A transmit filter for a stream of OFDM symbols has a remapper, Infinite Impulse Response (IIR) filter and a controller, the transmit filter operating on a stream of OFDM symbols. The transmit filter accepts symbols to be transmitted, the re-mapper re-orders them, the IIR filters the re-ordered stream, and a controller provides an output by rearranging the filtered symbols. The incoming symbol stream contains a series of symbols, each followed by a guard interval, where each guard interval has a first Tg symbol interval, and a second Tg symbol interval, the remapper generating a re-ordered stream having a first Tg symbol interval, a second Tg symbol interval and the symbol, the output of the IIR filter thereby generating a filtered first Tg symbol, a filtered second Tg symbol, and a filtered symbol, and the controller forms the transmit output by discarding the filtered first Tg symbol and outputting, in sequence, the filtered second Tg symbol, the filtered symbol, and a copy of the filtered second Tg symbol. The filtered second Tg symbol may be saved into a local buffer at the time it is initially output for use following the current symbol.

14 Claims, 6 Drawing Sheets

Analog Front End Interface
Prior Art

Inter Symbol Interference (FIR Filter)
Prior Art

Inter Symbol Interference (IIR filter)
Prior Art

Inter Symbol Interference

Decimation with truncated IIR filtering

Decimation with truncated IIR filtering

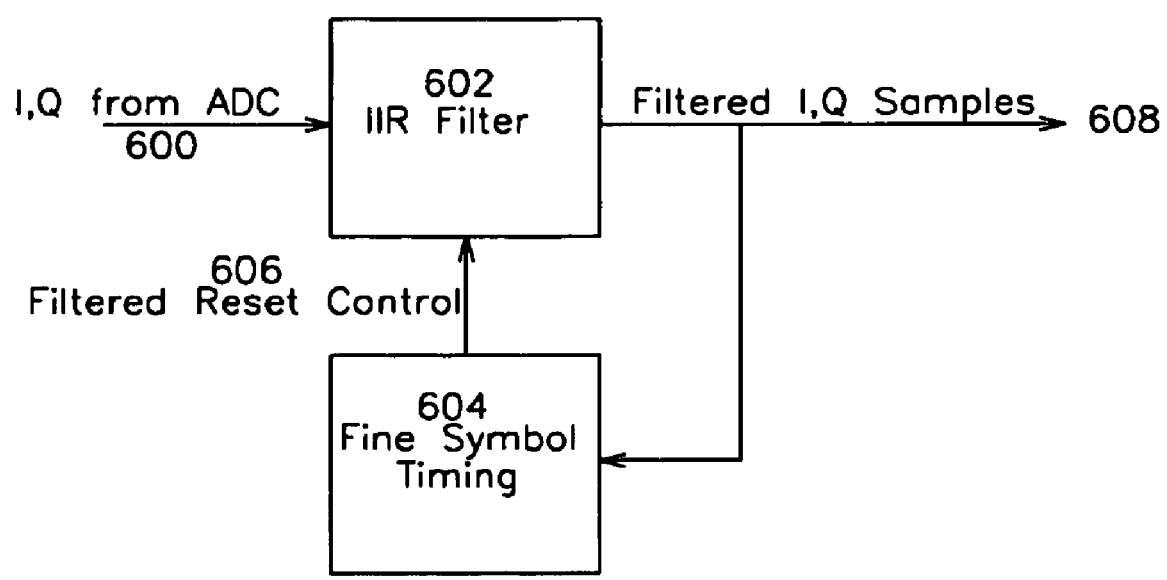

Transmit symbol re-arrangement for IIR truncation

IIR Filter Output

IIR Filter Controller Output

Transmitter Interpolation Filtering

Samples at Filter Input

Samples at Filter Output

IIR transmit filter implemented using BIQUAD filters

BIQUAD filter detail

IIR TRANSMIT FILTER FOR OFDM BASEBAND PROCESSOR

FIELD OF THE INVENTION

The present invention relates to filtering of data for use in an OFDM signal processing system. More specifically, the invention relates to filtering of OFDM baseband receive data and baseband transmit data using a truncated and decimated IIR filter.

BACKGROUND OF THE INVENTION

FIG. 1 shows a typical wireless LAN/MAN system with a radio frequency (RF) unit 104 coupled to baseband processor 118. The receive path includes RF front end 106 which amplifies received signals, which are then analog filtered 110 and digitized 112 at a sample rate Fs. The incoming samples at rate Fs are decimated by filter 120 to generate a decimator output 124 at rate Fs/2. Transmit data 126 at rate Fs/2 is provided to interpolation filter 122 which increases the incoming sample rate from Fs/2 126 to Fs, and those samples are applied to DAC 116, filtered 114, and applied to Tx Front End 108, which amplifies, upconverts, and couples to antenna 102. Typically the ADC and DAC sampling rate (Fs) is an integer multiple of the sample rate of the baseband processor generating transmit data 126 or receiving data 124, which simplifies the suppression of images caused by ADC 112 and DAC 116 sampling. The analog filter 110 and 114 requirements are also relaxed as these filters can be designed with a larger transition band. The residual image is filtered digitally in the baseband by the interpolation 122 and decimation 120 filters.

In the receive path, the decimation filter 120 removes the residual image and then down samples the input signal to the baseband sampling rate. In the transmit path, the interpolator 122 up-samples the baseband signal by inserting zeros in alternate samples, which are then filtered in the upsampled signal to remove images.

Interpolation filter 122 and decimation filter 120 are typically implemented in finite impulse response (FIR) filters, rather than infinite impulse response (IIR) filters in OFDM baseband processors. IIR filters have a register configuration where computed terms are fed back to earlier registers, which results in greater hardware efficiency and the need for fewer storage registers than FIR filters for the same spectrum shaping requirements. The drawback of IIR filters is the introduction of inter-symbol interference (ISI), hence degrading the performance of the wireless OFDM link in the presence of multipath reflection. FIG. 2A shows the affect of the increased filter impulse response on inter-symbol interference. A signal 202 represents the input signal at a first tap point of a multipath FIR filter, and signal 204 represents the input signal at a subsequent filter tap point. The FIR filter impulse response is shown in waveform 212, and the corresponding filter tail time response 214 is shown at the same time resolution as incoming data, which includes symbol S1 206 followed by cyclic prefix 208 and symbol S2 210. As can be seen from S1 region 214 representing the part of S1 which undesirably contributes to S2 filter output, a small part of the FIR response 212 from symbol S1 is bleeding into symbol S2. The filter impulse response adds to the delay spread caused by multipath and the overall spread can exceed the cyclic prefix 208. The part of the resulting delay spread that exceeds the cyclic prefix contributes to ISI. FIG. 2B shows the much larger ISI effect of IIR filters, where the impulse response 244 includes the much larger extent of S1 associated with the IIR filter tail extent 242 extending well into S1 which adds to the S2 response. The filter tail 242 which extends into S1 for an IIR filter as shown in FIG. 2B results in much greater ISI of S1 into S2 than the FIR filter of FIG. 2A.

It is desired to utilize a filter for receive decimation and for transmit interpolation, where the filter has a smaller number of taps such as an IIR filter, but without the excessive time response and related ISI associated with an IIR filter.

OBJECTS OF THE INVENTION

A first object of this invention is a receive decimation filter having a plurality of registers and operative on a stream of data which includes symbol data and final reflection data, the filter operative on the reflection data prior to the symbol data, where the filter is reset prior to the reflection data.

A second object of the invention is a transmit interpolation filter having a plurality of registers and operative on a stream of data which includes initial samples, symbol samples, and final samples, the transmit interpolation filter discarding the initial samples, operative on a cyclic prefix from memory followed by symbol samples, the interpolation filter being reset prior to the application of the cyclic prefix to the interpolation filter.

A third object of the invention is a remapper for a transmit interpolation filter which receives a plurality of samples, stores a range of samples from the input, and provides an output by re-ordering samples accompanied by the previously stored range of samples.

A fourth object of the invention is an infinite impulse response filter which is reset prior to the arrival of conditioning data which is followed by symbol data, where the conditioning data for receive is a cyclic prefix, and the conditioning data for transmit is remapped Tg samples.

A fifth object of the invention is an infinite impulse response filter for transmit filtering, where a stream of transmit data symbols, each transmit data symbol including in sequence a symbol, first gap data, second gap data is rearranged into a sequence of first gap data, second gap data, and symbol, thereafter upsampled by insertion of 0 data between samples, thereafter applied to an IIR filter which is reset at the start of the application of the first gap data, thereby forming a filtered first gap data, filtered second gap data, and filtered symbol, where an output is formed by outputting and saving the filtered second gap data, the filtered symbol, and then outputting the saved filtered second gap data, this sequence being done for each transmit data symbol.

SUMMARY OF THE INVENTION

A receive IIR filter with an impulse response equal to or longer than a cyclic prefix of a preamble operates in a regular mode during which a filter reset is not asserted during a preamble part of a received packet, the preamble part including a short and long preamble and a signal field. The IIR filter thereafter operates in a per-symbol truncated mode during a data part of a packet, the data part of the packet including a plurality of data symbols, each preceded by a cyclic prefix, whereby the registers of the IIR filter are reset and released from reset prior to or during each cyclic prefix which precedes a corresponding data symbol.

A transmit filter includes a remapper for an IIR filter, where the remapper receives a succession of symbols in the time domain, such as from the output from an inverse FFT (IFFT) as a time domain sequence comprising a plurality of complex values, each symbol of the succession being separated into a symbol interval, a first Tg interval, and a second Tg interval.

The remapper outputs, in sequence, the first Tg interval values, second Tg interval values, the symbol value, and the first Tg interval value again. The output of the remapper is provided to an upsampler for increasing the data rate such as by zero value insertion, and the upsampled values are provided to the input of an IIR filter which is reset at the beginning of each remapped first Tg interval. The output of the IIR filter is directed to a controller which, in sequence, discards the IIR filter output for the Tg1 interval and replaces it with a stored IIR filter output corresponding to a previous symbol first Tg1 interval, after which the IIR filter output corresponding to the filtered second Tg interval is output and also stored into a temporary buffer, after which the filtered symbol is output, after which the filtered first gap Tg1 is output, followed by the contents of the temporary buffer, which forms the cyclic prefix between the current symbol and the following symbol. A new transmit window is also defined by the filtered and stored second gap value, filtered symbol value, and second gap value which was previously stored. In this manner, a symbol value followed by a first gap value and second gap value is converted into a filtered (and saved) second gap value followed by a filtered symbol value, followed by a filtered first gap interval, followed by the saved (filtered) second gap value, thereby allowing the use of an IIR transmit interpolation filter while eliminating ISI from one symbol to the next. For each such symbol, the internal registers forming the IIR filter are reset or initialized prior to the remapper outputting the second Tg interval to the IIR filter, thereby clearing any previous symbol value from the IIR filter prior to the start of IIR filtering of the current symbol.

BRIEF DESCRIPTION OF THE DRAWINGS

FIG. 6 shows a block diagram for receive decimation filtering.

DETAILED DESCRIPTION OF THE INVENTION

Figure 1:
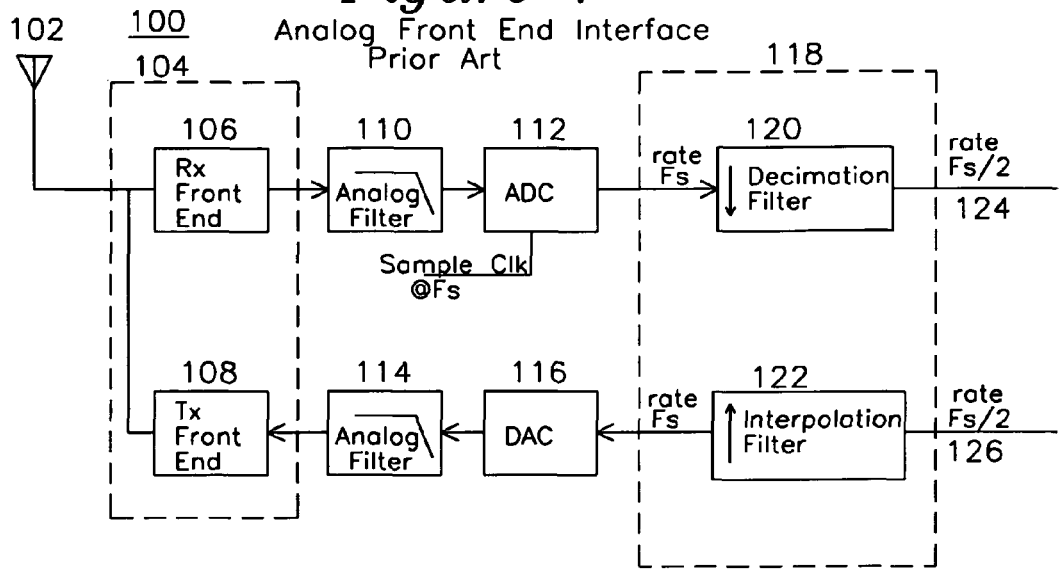
FIG. 1 shows a block diagram for a receiver front end.
Figure 2A:
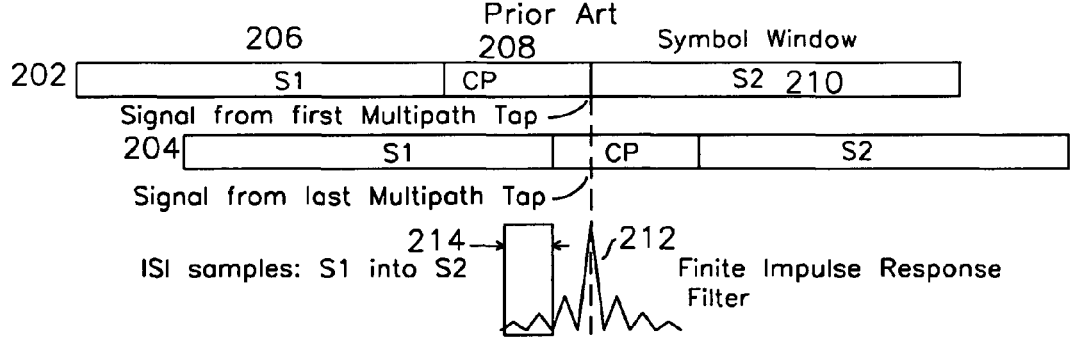
FIG. 2A shows a time diagram for a stream of signals and an FIR filter response tail.
Figure 2B:
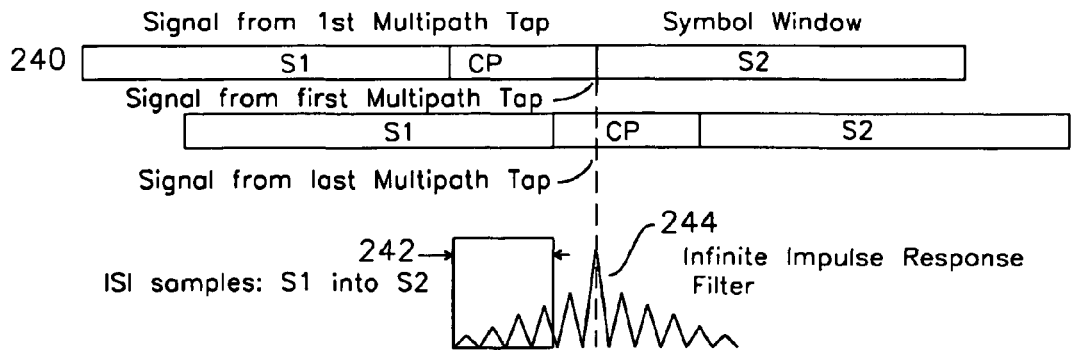
FIG. 2B shows a time diagram for a stream of signals and an IIR filter response tail.
Figure 3:
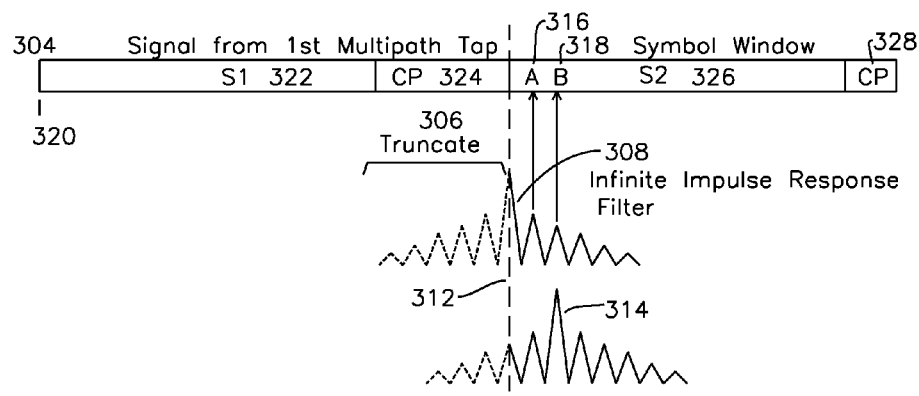
FIG. 3 shows a time diagram for inter-symbol interference with a truncated infinite impulse response filter response during a symbol window.

FIG. 3 shows a truncated IIR decimation filter for a receive decimator filter such as 120 of FIG. 1. The stream of input symbols 304 enters an IIR filter which has a non-truncation (normal) mode during which the filter operates in a conventional manner with data clocking into a register input and transferring to a register output on each clock cycle. The filter also has a truncation mode, where the registers are reset thus clearing all the information stored from previous samples, after which the registers of the filter operate on the newly arriving data and generate filter output values such as during non-truncation mode. In one example of the invention when receiving packets, the truncation filter is an IIR filter with the intermediate value registers of the filter are reset at particular points inside the packet, typically at the start of the cyclic prefix of either a preceding or successive data symbol.

In another example of the invention for reception of packets, the IIR filter operates in a non-truncated mode during a packet preamble (for which filter introduced ISI is not a consideration), and in a truncated mode when receiving a stream of symbols, such that the filter is reset for each incoming symbol.

FIG. 3 shows a generalized stream 304 of data which includes symbols 304 having a first symbol S1 322, a cyclical prefix CP 324, and a subsequent symbol S2 326. Each symbol crosses a truncation boundary such as 312, when the internal registers of infinite impulse response IIR filter 308 are taken out of a reset state. In one embodiment of the invention, a reset signal is generated at the start of each cyclic prefix (CP) which precedes a symbol. In this manner, the IIR filter clocks in and initializes using the CP which precedes the associated symbol. The IIR filter then operates on the incoming symbol data until it is again reset when a new symbol window arrives, such as upon arrival of the next CP of the symbol stream. In another embodiment of the invention, the truncation window 312 indicates the instant of IIR register reset, and the window 312 may be placed at the start of the symbol window 316, such that the IIR filter is reset at the moment the symbol such as 326 arrives at time 312, or the IIR filter may be reset during at a particular instant which occurs during the interval of the cyclic prefix 324. For symbol S2 of FIG. 3, first sample point A may be the first symbol data clocked into the filter after truncation boundary 312, followed by second at second sample point B, continuing until the end of the symbol window, which includes the subsequent CP 328. This truncation through reset boundaries which occur between symbols ensures that samples from the previous symbol do not add into the filter output for the current symbol, thereby addressing ISI resulting from the long impulse response time of the IIR filter. The advantage of this filter truncation technique is that the distortion introduced as a result of filter truncation does not have as significant an impact as the inter-symbol interference (ISI) which is significantly reduced by the truncation technique.

Figure 4:
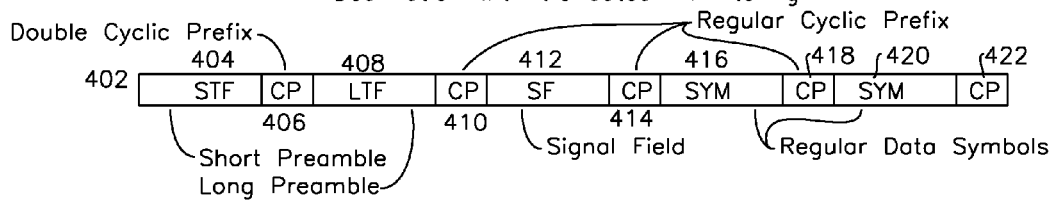
FIG. 4 shows a time diagram for decimation with a truncated IIR filter over a packet having a preamble part and signal field part and a data part.

FIG. 4 shows a Wireless LAN (such as described in the IEEE wireless LAN standards IEEE 802.11a or IEEE 802.11g) OFDM packet 402 comprising a short preamble 404, double cyclic prefix 406, long preamble 408, cyclic prefix 410, signal field 412, cyclic prefix 414, and a stream of subsequent data symbols 416, 420, each of which are separated by a cyclic prefix 418, 422. As the packet enters the receiver, Automatic gain control (AGC) is performed over the initial short preamble samples 404. The remaining samples of the short preamble 404 are used to identify a WLAN packet and also to acquire a coarse estimate of the frequency offset and symbol timing. The long preamble 408 is then used to derive a finer estimate of the symbol timing and frequency offset. The signal field 412 is a BPSK modulated symbol that contains information such as the rate of transmission and the length of the packet.

Truncated IIR filtering can be used on the subsequent stream of data symbols 416, 420 once the symbol boundaries have been identified. The state of the IIR filter is then reset at the symbol boundaries, which results in removing the contribution to the impulse response from the adjacent symbol. Since this procedure requires knowledge of symbol boundaries, it can be performed only after the symbol timing has been identified from the long preamble 408.

Figure 5:
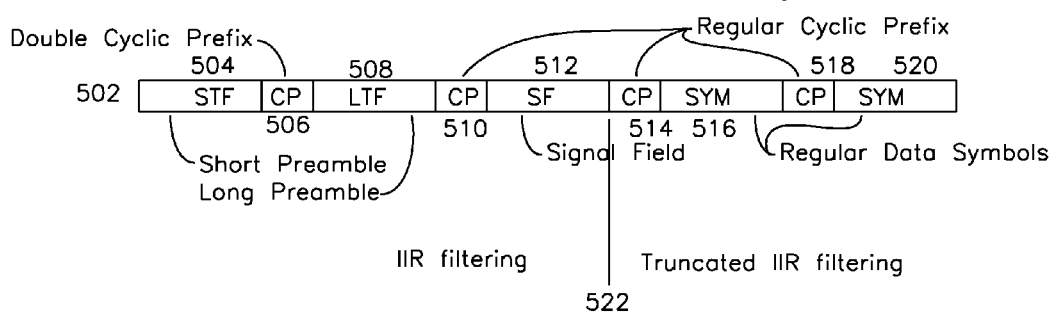
FIG. 5 shows a time diagram for a truncated filter applied to an OFDM packet.

FIG. 5 shows the position 522 in the WLAN packet 502 at which non-truncated (or regular) IIR filtering is switched to truncated filtering. The individual fields of the packet 502 are labeled as described for FIG. 4. Regular filtering is performed over the long preamble 508 and signal field 512. However the symbols in these fields are not affected by ISI. The long preamble 508 has a double guard interval that minimizes ISI and the signal field 512 uses a very robust modulation and coding that is tolerant to ISI. The parts of the packet 502 which precede the first data symbol, including short preamble 504, long preamble 508, and signal field 512, as well as cyclic prefixes 506 and 510, are referred to as a header part, and all header parts are subject to regular (non-truncated) IIR filtering, whereas the IIR filter changes to truncated mode filtering for each of the symbols 516 and 520 of the data part of the packet which follows the header part. The symbol timing that was established during the long preamble 508 establishes the precise symbol boundaries 516, 518, etc, and these boundaries are used to hold the IIR filter in reset preceding each symbol 516, 518, releasing the IIR filter reset state as each symbol of the data part of the packet enters the filter.

FIG. 6 shows one example embodiment of the receive filter 600, suitable for use as receive decimation filter 120 of FIG. 1. The input stream of IQ data from the receive ADC 112 is applied to filter 602 and also to fine symbol timing 604, which locates the symbol boundaries based on the long preamble part of the packet. Once the fine symbol-timing module 604 establishes the symbol boundaries, it resets the IIR filter 602 state at the first sample of the cyclic prefix of every symbol. Many different configurations of IIR filters may be used 602, with each filter resetting at the beginning of each symbol. The filter is typically reset in its entirety (all of the registers forming the IIR filter are reset at once), or it may be partially reset, such as by clearing the contents of the individual registers. Additionally, the filter may be reset at a single point in time following the CP, as identified by a symbol timing function which determines the symbol timing of the regular data symbols from the packet preamble, or the filter may be reset during an interval of the CP prior to the arrival of a symbol.

A different form of the IIR can also be considered for use in the transmit filter, shown as interpolation filter 122 of FIG. 1. A similar ISI problem as was described for receive decimation filtering arises in transmit interpolation filtering when using IIR filters which have the advantage of using fewer registers than FIR filters but the disadvantage of longer response time. The longer response time of the IIR filter compared with the FIR filter can add signal energy from previous transmit symbols into the current transmit symbol, which is as undesirable for the transmit case as for the previously described receive case. In transmit operation, it is possible to use the truncated IIR filter for the transmit interpolation filter in a different manner by using a remapper at the input of the IIR filter to rearrange gap values to the start of the symbol value, resetting the IIR registers when those gap values are presented to the input of the IIR filter, and using an output controller at the output of the IIR filter for discarding the first part of the IIR filter output, storing and outputting a valid part of the filtered output, then outputting the filtered symbol value, and then outputting the previously stored output. This has the effect of resetting the filter to clear previous symbol values, and during the interval of time the transmit filter is "initializing" with data for the new symbol during a first gap interval, outputting the previous stored previous gap information for the previous symbol. Then, during the current symbol interval, which starts after the IIR filter output is initialized with first gap data, outputting filtered first gap data followed by filtered symbol data, followed by filtered first gap data which was previously stored.

Figure 8A:
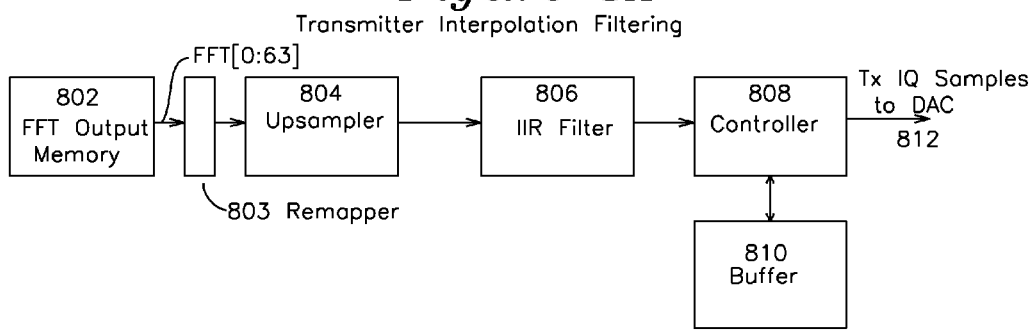
FIG. 8A shows a block diagram for transmitter interpolation filtering including a remapper for the IFFT output.
Figure 8B:
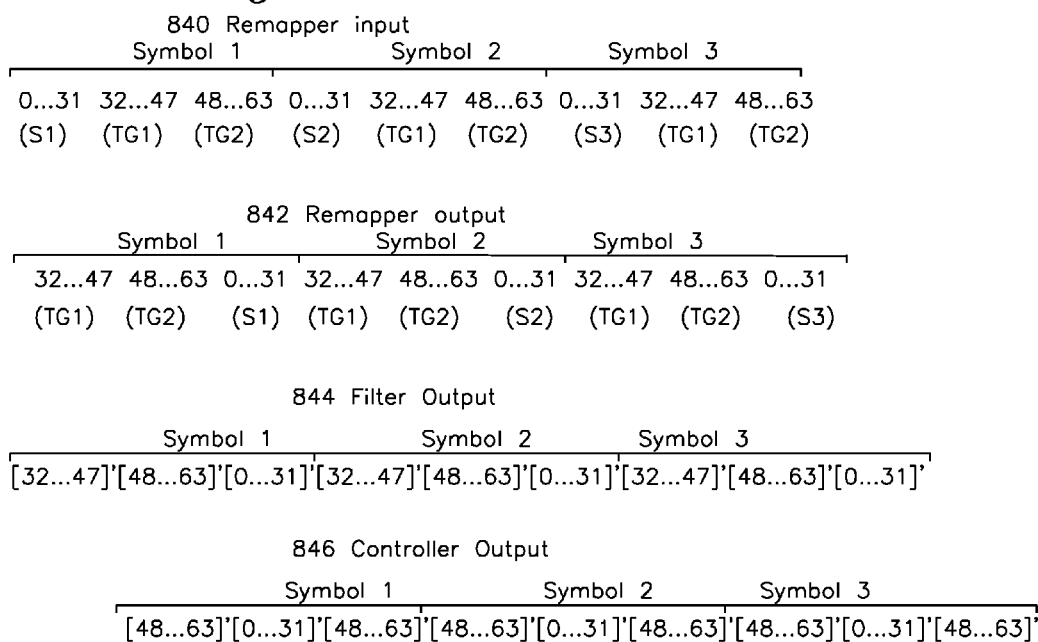
FIG. 8B shows an example remapping of FFT output samples as performed by the remapper of FIG. 8A.
Figure 9:
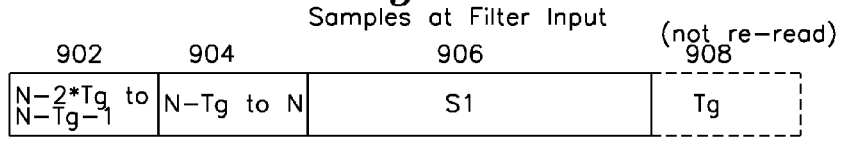
FIG. 9 shows the time diagram for a sequence of samples applied to an interpolation filter input.
Figure 10:
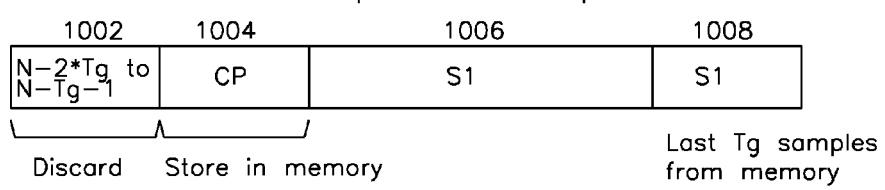
FIG. 10 shows samples at the output of an interpolation filter.

FIG. 8A shows an example IIR transmit filter embodiment in a system which is suitable for use in the transmitter of FIG. 1. The samples for a symbol are read out of the FFT output memory 802 such as the parallel output of a time domain sequence that is concatenated together for a particular example shown in FIG. 8B. FFT 802 output consists of 64 output values delivered in a parallel fashion to remapper 803 and shown as remapper input 840 sequence of FFT output values [0 . . . 63]. Remapper 803 output 842 is shown for one example, where the symbol duration is divided into a symbol part such as [0 . . . 31], a first gap part such as [32 . . . 47] and a second gap part [48 . . . 63]. The associated symbol part S1, S2, S3 is placed after the associated first and second gap Tg1 and Tg2 for each symbol. These are upsampled 804 by inserting the value 0 between samples, and applied to IIR filter 806 input. The IIR filter is reset at the beginning of each symbol, and the IIR filter output for each time domain series input such as 32 . . . 47 is noted as [32 . . . 47]' to indicate the filtering operation on these samples, and shown as filter output 844. The controller 808 stores the series of samples associated with the filtered second gap shown as [48 . . . 63]' into a filter while simultaneously outputting them, such that the first 32 samples are discarded, and the next 32 samples are filtered and placed in front of the filtered symbol data [0 . . . 31]' followed by first gap data [32 . . . 47], as shown in the sequence of remapper output 846. FIG. 9 shows a generalized version of the controller 808 operation. The upsampler 804 of FIG. 8A inserts zeros between every two samples that have been re-arranged by remapper 803 as was previously described, and the upsampler 804 hence doubles the sampling rate. The upsampled signal is then applied to IIR filter 806 input as shown in FIG. 9. The FIR filter output is handled by the controller 808 as follows:

Step 1) The first Tg samples 1002 at the output of the filter are discarded to avoid samples with a truncated filter response;

Step 2) The second Tg samples 1004 are output to the DAC and also stored in a separate buffer 810 of FIG. 8A;

Step 3) The symbol 1006 is read out and output to the DAC;

Step 4) The contents of the buffer 810 from step 2 are read out and output to the DAC.

Figure 7A:
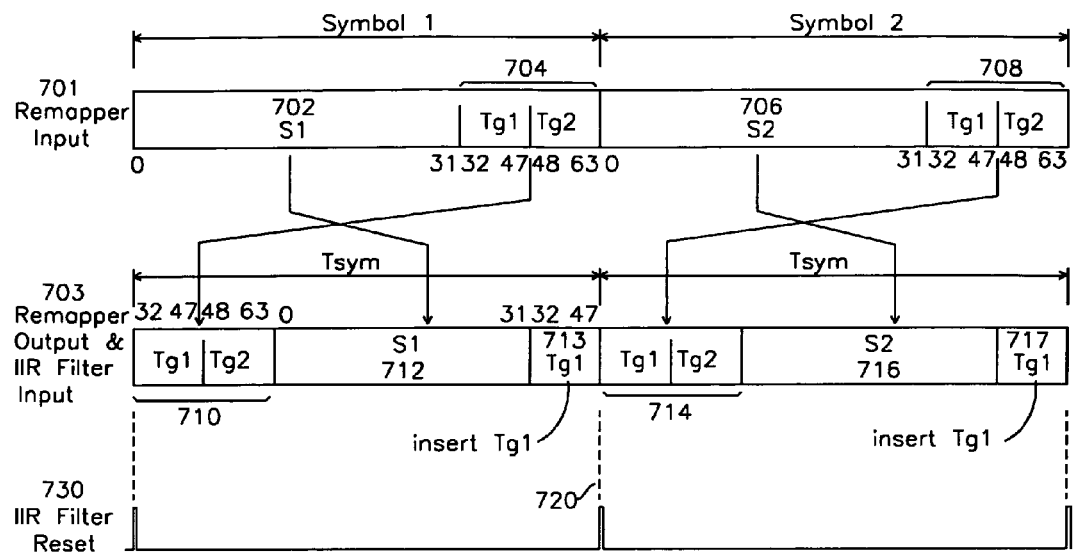
FIGS. 7A, 7B, and 7C show sample rearrangement for IIR cyclic interpolation filtering of OFDM data.
Figure 7B:
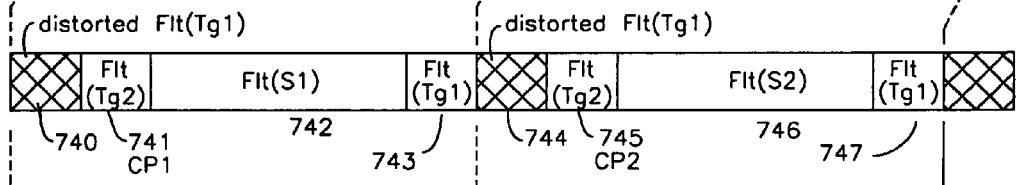
Figure 7C:
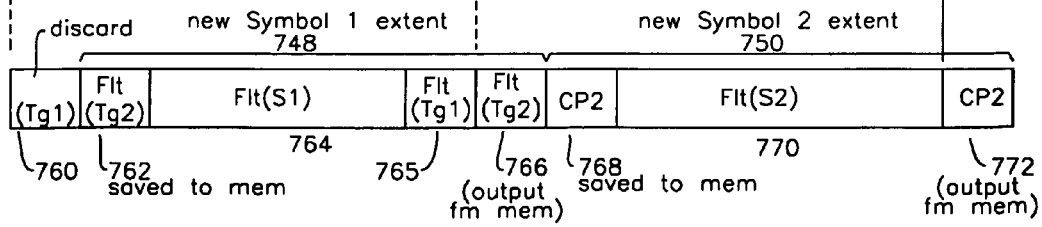

FIG. 7A shows the operation of the transmitter filter where the output of the FFT 802 of FIG. 8A is coupled to the input of the remapper 803, which input is shown as parallel output 701 in FIG. 7A. The FFT output 701 is a succession of parallel values (such as FFT[0] . . . FFT[63]) which are provided during each symbol interval 705 and 707 shown. The remapper 803 accepts the FFT output, which includes symbol S1 702 and Gap 704, which gap is subdivided into Tg1 and Tg2, and rearranged and serialized with Tg1 inserted after the symbol part to form serial output 703 to upsampler 804 which doubles the sample rate, such as by inserting 0s into alternating samples. The remapper 803 output is formed by placing the remapper input gap values 704 at the start of the serial stream 710 followed by symbol S1 712 which is formed by shortening remapper input S1 702 by an interval equal to Tg2 as shown in stream 703. The remapper output 703 thereby produces a serial stream of data containing Tg1, Tg2, S1, and Tg1. This serial stream of data is interleaved with 0s by the upsampler 804 and is applied to the IIR filter 806. At the beginning of each symbol frame interval Tsym, the associated IIR filter 806 has all of its internal registers reset, as shown by waveform 730 asserting reset at the beginning of each Tsym. The output of the IIR filter shown in FIG. 7B now contains a stream of values, and since the IIR filter was reset 730 at the beginning of each symbol interval, the initial output 740 associated with interval Tg1 contains invalid values, as the IIR filter started filtering from reset internal register values until the passage of Tg1 interval and the presentation of CP1 741 from filtered Tg2, followed by the filtered symbol part 742 and the filtered first gap 743. The IIR filter output for the subsequent frame interval contains invalid output 744 followed by CP2 745 formed by the filtered Tg2 value from serial stream 703 applied to the IIR filter, followed by filtered first gap values 747, followed by the invalid interval for the next symbol window. As is clear to one skilled in the art, the description of the output of the IIR filter following each reset operation is a complicated mixture of feedback values formed from a discontinuous input value applied to reset IIR internal registers, however the duration of Tg1 is selected to bring the filter output to a steady state value such that the distortion associated with resetting the filter is minimized at the time of TG2 741 output. The IIR controller 808 forms output values 812 using the output stream from IIR filter 806 in combination with buffer 810, which generates the controller output 812 shown in FIG. 7C. After discarding invalid Tg1 760, the value CP1 762 associated with each current frame is output to serve as the cyclic prefix (CP) preceding the symbol, and the CP1 value is also saved into a memory, after which the present filtered symbol S1 764 from the IIR filter is output, followed by the filtered first gap value 765, and the previously saved value 762 is output during the interval 766 which follows the corresponding current symbol S1 764. The subsequent controller output comprises CP2 768 formed from IIR filter output of input 745 (with contribution from TG1 of 714 to the filter input), and also saved in buffer memory 810, followed by filtered S2 770 from filter output 746, followed by the filtered first gap value, followed by CP2 772, which was saved in buffer 810 from CP2 768. The result of resetting the filter, discarding the initial Tg1 interval output, saving CP1 and outputting it at the end of the current symbol from the buffer has the effect of shifting the symbol boundaries as shown in new symbol 1 extent 748 and new symbol 2 extent 750 as shown in FIG. 7C.

Figure 11:
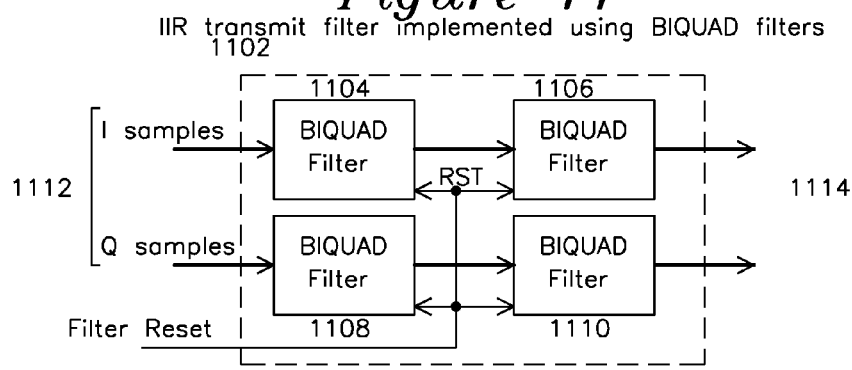
FIG. 11 shows a block diagram for a filter suitable for use in the present invention.
Figure 12:
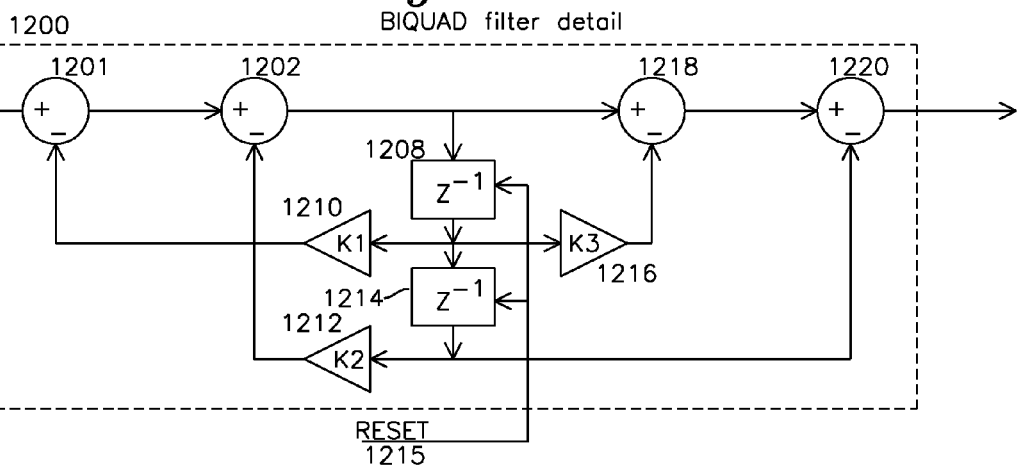
FIG. 12 shows a detailed block diagram for one embodiment of a single Biquad filter.

One example embodiment of an IIR filter 1102 using BIQUAD filter elements is shown in FIG. 11. The number of BIQUAD sections required is N/2 where N is the filter order, such that the example of FIG. 11 is a second order filter with quadrature input 1112 including I samples and Q samples, which undergo identical processing for the I channel 1104, 1106, and the Q section 1108, 1110 to generate quadrature output 1114. FIG. 12 shows an example BIQUAD filter section 1200 which includes resettable registers 1208, 1214, feedback adders 1201, 1202, 1218, 1220, and scaler multipliers 1210, 1212, and 1216. The registers 1208, 1214 of each BIQUAD IIR filter section are reset using signal 1215 at the beginning of each symbol interval, thereby removing any previous symbol history from the present symbol to be filtered.

What is claimed is:

1. A transmit filter for a stream of OFDM symbols, each symbol being separated into, in sequence, symbol data and a guard interval having guard data comprising first Tg data in a first interval and second Tg data in a subsequent interval, the transmit filter comprising:

a remapper configured to receive said stream of OFDM symbols and generate an output signal;

an infinite impulse response (IIR) filter having an output and an input coupled to said remapper to filter the output signal; and a controller having an output and an input coupled to the output of said IIR filter, said remapper accepting said symbol data, said first Tg data and said second Tg data, thereafter generating the output signal comprising, in sequence, said first Tg data, said second Tg data, and said symbol data, and said controller accepting a stream of filtered data from said IIR filter, said stream of filtered data including filtered first gap data, filtered second gap data, and filtered symbol data, said controller generating the output having, in sequence, said filtered second gap data, said filtered symbol data, and a copy of said filtered second gap data.

2. The transmit filter of claim 1 where said controller stores said filtered second gap data for forming said copy of said filtered second gap data.

3. The transmit filter of claim 1 where said remapper includes data interpolation.

4. The transmit filter of claim 3 where said interpolation inserts one or more 0 values between adjacent samples.

5. The transmit filter of claim 3 where said remapper outputs a data rate which is twice the input data rate of said remapper.

6. The transmit filter of claim 1 where said IIR filter is a BIQUAD filter.

7. The transmit filter of claim 1 where said stream of OFDM symbols has an I channel and a Q channel, said IIR filter includes a first and second BIQUAD filter for each said I channel and said Q channel, and said BIQUAD filter is reset at the start of each first Tg data.

8. A transmit filter comprising:

a remapper accepting 64 values, said values being, in sequence, symbol values [0 . . . 31], first gap values [32 . . . 47], and second gap values [48 . . . 63], said remapper rearranging said values to form a remapper output, in sequence, of said first gap values [32 . . . 47], said second gap values [48 . . . 63], and said symbol [0 . . . 31];

an upsampler for expanding each remapper output value to a value accompanied by one or more zero values;

an infinite impulse response (IIR) filter coupled to an output of said upsampler and receiving a reset signal for initializing registers of said IIR filter, said IIR filter generating, in sequence, filtered first gap values [32 . . . 47], filtered second gap values [48 . . . 63], and filtered symbol values value [0 . . . 31]; and a controller coupled to said IIR filter and generating an output having, in sequence, said filtered second gap values [48 . . . 63], said filtered symbol values [0 . . . 31], and a copy of said filtered second gap values [48 . . . 63].

9. The filter of claim 8 where said IIR filter is a BIQUAD filter.

10. The filter of claim 8 where said IIR filter is a cascade first and second BIQUAD filter coupled to an I channel of an output of said upsampler, and a cascade first and second BIQUAD filter coupled to a Q channel of an output of said upsampler.

11. The filter of claim 8 where said IIR filter is reset upon the application of said first gap values.

12. The filter of claim 8 where said upsampler expands each output value of said remapper by inserting a 0 value and doubles the output rate of the upsampler compared to the input rate of the upsampler.

13. The transmit filter of claim 8 where said controller stores said filtered second gap values for forming said copy of said filtered second gap values which is output after said filtered symbol value is output.

14. The transmit filter of claim 8 where said controller outputs values are transmitted to the antenna of a wireless local area network.

* * * * *